UNITED STATES PATENT OFFICE.

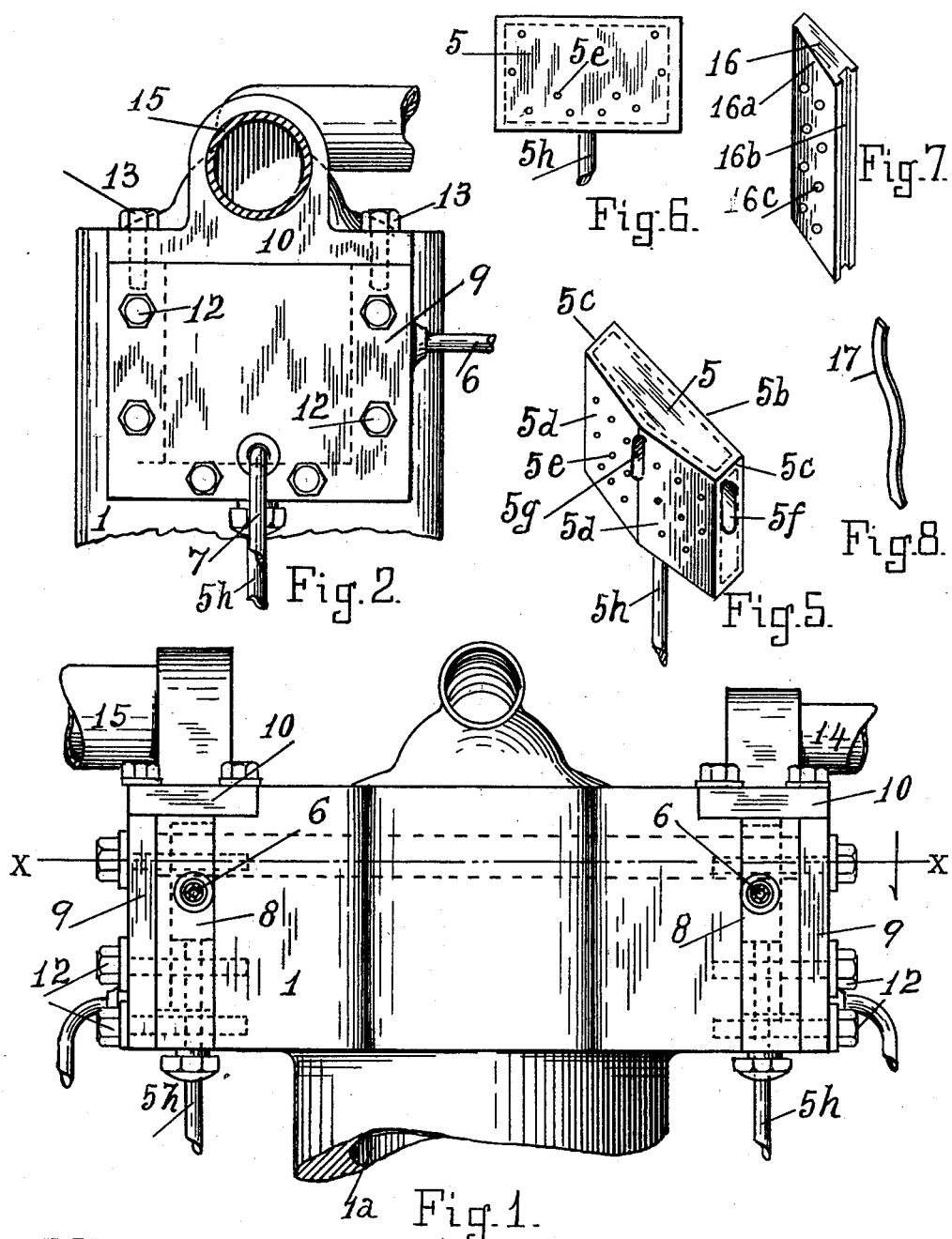

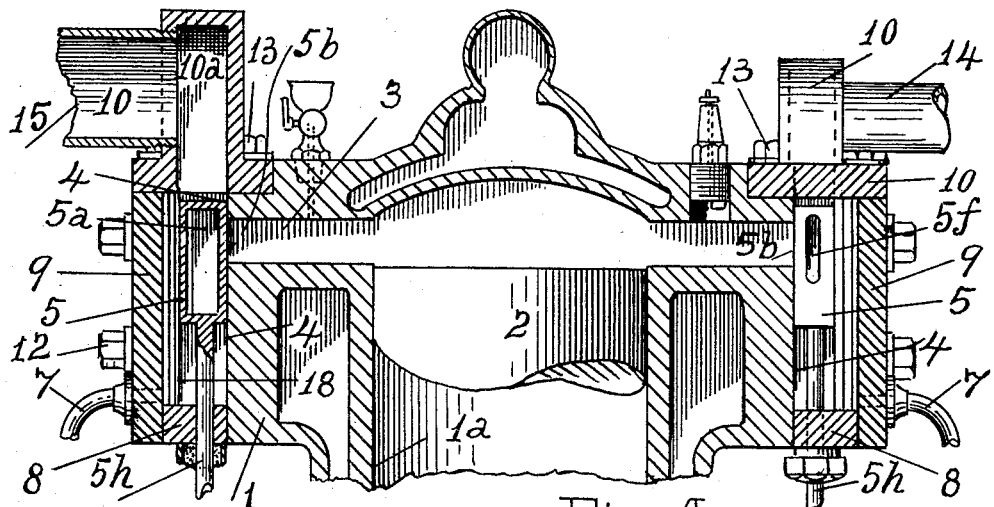
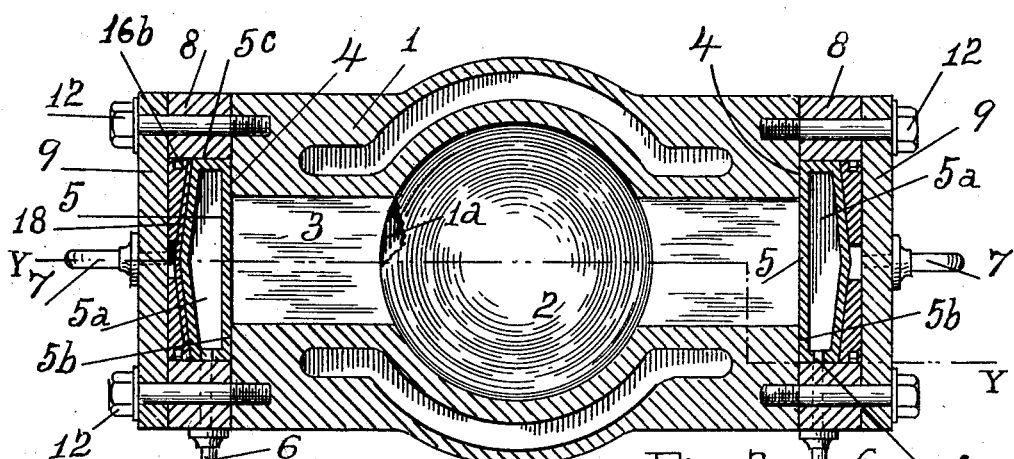
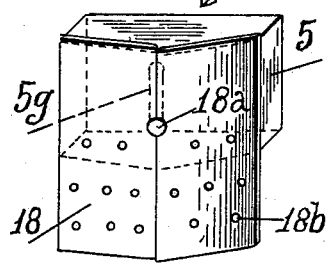
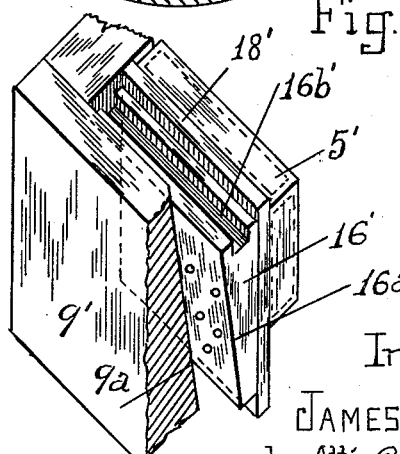

JAMES L. COOK, OF SPRINGFIELD, ILLINOIS.

VALVE MECHANISM FOR INTERNAL-COMBUSTION ENGINES.

1,115,901.          Specification of Letters Patent.          Patented Nov. 3, 1914.

Application filed August 12, 1912. Serial No. 714,689.

*To all whom it may concern:*

Be it known that I, JAMES L. COOK, a citizen of the United States, residing at Springfield, in the county of Sangamon and State of Illinois, have invented a new and useful Valve Mechanism for Internal-Combustion Engines, of which the following is a specification.

This invention relates primarily to slide valves for gasolene engines but obviously is adaptable to other engines in which explosion within the cylinder takes place.

The purposes of the invention are: to provide in conjunction with the cylinder body of an internal combustion engine, external plane valve seats preferably situated on the cylinder body diametrically opposite to each other for reasons hereinafter stated; to provide valves adapted to slide on the external plane valve-seats and having reservoirs adapted to contain continuously moving volumes of oil for lubricating the faces of the valves and other parts contacting therewith and effective to cool the valves; to provide means for supplying oil within the reservoir of the valves; to provide means effective to keep the valves on the valve seats at all times, and effective to form gas tight joints between the valves and the valve seats so that the valves will not be displaced by the explosions within the cylinder, and also effective to compensate for wear of the valves or valve seats; to provide means to prevent the carbon resulting from the explosions in the cylinder from fouling the contacting moving surfaces of the valve mechanism and obstructing the flow of oil; and to provide other features of construction as will hereinafter appear.

The invention is illustrated in the annexed drawings.

Figure 1 is a partial side elevation of an engine embodying this invention. Fig. 2 is a left-hand end elevation of the engine. Fig. 3 is a horizontal transverse section on the line X. X. of Fig. 1. Fig. 4 is a vertical section on the line Y. Y. of Fig. 3. Fig. 5 is a perspective view of one valve detached. Fig. 6 is an elevation of the inner face of one valve. Fig. 7 is a perspective view of one wedge-plate detached. Fig. 8 is an enlarged perspective view of one of the springs acting on the wedge-plates; Fig. 9 is a perspective view of one pair of guard-plates in contact with one valve; and Fig. 10 is a perspective view of a valve and appurtenances of modified construction.

Similar reference characters designate like parts in the different views.

The cylinder body 1 has a central bore $1^a$ accommodating the piston 2 and is cored out in the usual manner to admit of water circulation around the cylinder. At the upper end of the cylinder is a transverse way 3 extending entirely across the cylinder. At the outer ends of the way 3 external plane valve seats 4 are formed on the cylinder body. The valves 5 are housed in suitable valve cases hereinafter described. Each valve 5 has a chamber or reservoir $5^a$ adapted to accommodate a continuously moving volume of oil effective to cool the valve, also effective to lubricate the valve, the valve-seat with which the valve contacts and the wedge plates or guard plates contacting with the valve.

The valves have flat inner faces $5^b$ which contact with the valve seats 4, flat sides $5^c$ which contact with the inner vertical side walls of the valve cases and inclined outer faces $5^d$ with which the wedge-plates or the guard-plates, as the case may be, contact. The walls of the valves are pierced by small holes $5^e$ through which the oil from the chambers $5^a$ seeps outward and is applied on the contacting parts of the valve, the valve seats, the wedge-plates, and the guard-plates. The faces $5^b$ contacting with the seats 4 are flat and true so that when the valve is seated gas will not leak between them. Oil is admitted to the chambers $5^a$ through ports $5^f$ in communication with pipes 6 conveying the oil from any suitable source of supply, (not shown.) The valves have overflow openings $5^g$ through which the excess of oil passes downward along the outer faces of the valves into the interior of the valve casing and thence outward through the pipes 7 and thence back to the source of oil supply. Preferably the oil supplied within the valves will be pumped from the crank case in the usual manner and after passing through the valves will return to the crank case to be again used, thereby economizing in the use of oil.

The valve cases comprise central members 8 of approximately U-shape, side plates 9, and covers 10. Bolts 12 connect the members 8 and the plates 9 with the cylinder body. Bolts 13 connect the covers 10 with the plates 9 and the cylinder body. Each of the covers 10 has an internal chamber 10ª. The intake pipe 14 communicates with the chamber 10ª of one cover and the exhaust pipe 15 communicates with the chamber 10ª of the other cover.

The wedge-plates 16 are preferably of bronze and of the form shown in Fig. 7 and have one inclined face 16ª contacting with the inclined face of the valve or with the guard-plate interposed between the valve and the wedge-plate, as the case may be. Each wedge-plate also has a longitudinal channel 16ᵇ adapted to accommodate a spring 17 fitting loosely in the channel. Small holes 16ᶜ permit oil to circulate through the wedge-plates to lubricate both sides thereof. The inclined faces of the valves and the inclined faces of the wedge-plates are so related to each other that the wedge-plates will rigidly oppose outward displacement of the valves and the wedge plates will move with minimum resistance with their inclined faces in contact with the inclined faces of the valves to keep the inner flat faces of the valves against the valve seats.

It is desirable to provide on the exhaust side of the engine means to prevent fouling of the surfaces of the valves and the wedge-plates and to prevent the carbon from obstructing the oil outlet pipe 7. For this purpose guard-plates 18 (shown in detail in Fig. 9) preferably of bronze are interposed between the inclined outer faces of the valve and the inclined inner faces of the wedge-plates. The guard-plates extend the full height of the wedge-plates and the valve slides on the guard-plates. An opening 18ª one half of which is formed in each guard-plate permits oil from the overflow opening 5ᵍ to flow outward between the guard-plates. The lower parts of the guard-plates below the opening 18ª are pierced by holes 18ᵇ through which oil from the valve passes to lubricate both sides of the guard-plates.

For the purpose of convenient recital in the claims it is here stated that the wedge-plates alone acting directly on the inclined faces of the valves on the intake side of the engine constitute keepers movable transversely of the valve to take up wear and rigidly opposing outward displacement of the valve. Likewise the wedge-plates acting through the intervening guard-plates on the inclined faces of the valves on the exhaust side of the engine serve as keepers adapted to take up wear and rigidly oppose outward displacement of the valve.

Any suitable means may be used to reciprocate the valves in such time that they will coöperate with the other elements of the mechanism to admit the explosive mixture to the combustion chamber, compress and ignite the mixture, and exhaust the gases from the combustion chamber.

When the parts occupy the position shown in Fig. 4 both valves are closed, the cylinder is at the limit of its upward stroke and the mixture is compressed in readiness for explosion. When the explosion occurs the piston will descend and when it reaches the lower limit of its movement the left-hand valve 5 will slide downward and the gases will escape through the exhaust pipe 15 and immediately thereafter the left-hand valve will be closed and the right-hand valve will be opened to admit the mixture to the cylinder through the pipe 14, and the right-hand valve will then be closed and the next explosion will occur; and so on in regular sequence.

In practice it is found that the accumulation of carbon in the ignition chamber and on the upper end of the piston frequently causes premature explosion by reason of the carbon becoming ignited and causing the premature ignition of the mixture introduced into the cylinder. Prior to my invention it has been exceedingly troublesome to remove this carbon from the chamber and the piston head for the reason that it has been necessary to practically dismount the engine before access could be had to the interior of the cylinder body for the purpose of removing the carbon as stated.

The construction herein set forth affords easy access to the combustion chamber and the upper end of the piston. In order to remove the carbon it is only necessary to detach one or both of the valve cases, whereupon a scraper or other suitable instrument inserted in the way 3 from either end, will serve to remove the accumulation of carbon.

I have shown and described a preferred mechanism comprising tapered wedge-plates having a flat face and an inclined face, coöperating with a valve having a flat face contacting with the valve seat and two inclined faces with which the wedge-plates contact. The inclination of the inclined faces of the valve with respect to the inclined faces of the wedge-plates is such that the wedge-plates have the maximum efficiency in opposing outward displacement of the valve when the explosion occurs, and the inclined faces of the valve offer the least possible resistance to transverse movement of the wedge-plates thereon. This construction, however, may be varied without departure from my invention. For example, the valve may have two flat faces and a vertically disposed wedge-plate may have a flat face in contact with the flat face of the valve and an inclined face in contact with a correspondingly inclined wall of the valve case.

The mechanism of modified construction shown in Fig. 10 comprises a rectangular box valve 5′, a guard-plate 18′, a wedge-shape keeper 16′, and an outside plate 9′ having an inclined inner surface 9ª with which the inclined surface 16ª′ of the keeper 16′ contacts. The keeper has a longitudinal channel 16ᵇ′ adapted to accommodate a spring 17 which may be used to act on the keeper; in this construction however, the keeper tends to gravitate downward and the use of the spring to move the keeper is not essential.

The operation of the valve and keeper of modified construction is obvious and need not be particularly described. Other modifications will readily occur to those skilled in the art and need not be detailed here.

The essence of the present invention resides in the valves adapted to contact and slide on valve seats external to the combustion chamber of an internal combustion engine and automatically acting means for preventing outward displacement of the valves at the instant of explosion and for taking up the wear of the parts. The means for cooling the valve and lubricating the valve and the parts contacting therewith is likewise an important feature of this invention.

Having fully described my invention what I claim as new and desire to secure by Letters Patent is:

1. Valve mechanism comprising a cylinder body having a way in communication with the interior of the cylinder and a flat valve seat; a valve adapted to slide on the flat valve seat to open and close the way, and having an oil chamber; and a keeper effective to keep the face of the valve in contact with the valve seat and to rigidly oppose outward displacement of the valve; said valve being effective to apply oil from the chamber thereof on the valve seat and on the keeper.

2. Valve mechanism comprising a cylinder body having a flat valve seat and a way extending through the valve seat and in communication with the interior of the cylinder; a valve adapted to slide on the valve seat and having a flat face contacting therewith to control communication through said way and also having inclined faces; and wedge-plates movable laterally relative to the valve and having inclined faces contacting with the inclined faces of the valve and rigidly opposing outward displacement of the valve.

3. A valve having an oil chamber and perforations for distributing oil on the faces of the valve, in combination with plates contacting with the valve and having perforations adapted to permit oil from the valve to pass through the plates.

4. The combination of a cylinder body having a cylinder, a valve-seat, and a way in communication with the interior of the cylinder; a valve-casing inclosing the valve-seat of said cylinder-body; a valve having a reservoir adapted to accommodate a flowing volume of oil effective for lubrication and also effective for cooling the valve and having a port admitting oil to the valve, perforations through which oil is applied on the contacting faces of the valve and the valve-seat and an opening for the discharge of the overflow oil into the valve casing; and means for discharging the overflow oil from the valve-casing.

5. The combination of a cylinder body having flat valve seats; self-lubricating valves adapted to slide on the valve seats respectively; and wedge-plates contacting with the valves and having perforations adapted to distribute oil from the valve on both sides of the wedge-plates.

6. The combination of a self-lubricating slide valve; a keeper-device adapted to compensate for wear of the parts and adapted to rigidly oppose outward displacement of the valve; and a perforated guard-device interposed between the keeper and the valve and effective to distribute oil from the valve on the keeper.

7. A valve comprising a reservoir adapted to accommodate a flowing volume of oil effective for lubrication and also effective for cooling the valve, and having an intake port in communication with the reservoir, perforations through which oil passes to lubricate the valve and an overflow opening; in combination with a valve-seat on which the valve is movable.

8. The combination of a cylinder-body, comprising a cylinder, a valve-seat, and a way in communication with the interior of the cylinder; a valve conforming to and adapted to move on said valve-seat and having a reservoir within the valve adapted to accommodate a flowing volume of oil effective for lubrication and also effective for cooling the valve, also having a port adapted to admit oil to the reservoir in the valve, perforations through which oil is applied to the contacting surfaces of the valve and the valve-seat and an opening for the discharge of overflow oil; and means for conveying away the overflow oil.

9. The combination of a cylinder-body having a valve-seat; a valve casing inclosing the valve-seat of the cylinder-body; a valve conforming to the valve-seat and movable within the valve-casing and having a reservoir adapted to accommodate a flowing volume of oil effective for lubrication and also effective for cooling the valve, a port for admitting oil to the reservoir of the valve, perforations through which oil is applied on the contacting surfaces of the valve and the valve seat, and an opening through which overflow oil from the reservoir of the valve passes to the interior of the valve-casing; and means for conveying the overflow oil away from the valve-casing.

10. In valve mechanism, the combination of a slide valve having a chamber adapted to contain a volume of oil, a perforated flat inner face and inclined perforated outer faces; perforated wedge-plates movable relative to the valve and having inclined faces contacting with the inclined faces of the valve respectively; and a casing housing the valve and the wedge plates; all co-acting to lubricate both sides of the valve and both sides of the wedge-plates.

11. The combination of a valve casing; a perforated slide-valve having a chamber adapted to accommodate a flowing volume of oil; a perforated guard-plate contacting with the valve; and a perforated keeper contacting with the guard-plate and one wall of the casing to keep the valve on its seat and rigidly oppose outward displacement of the valve; all constructed and arranged to lubricate both sides of the valve, the guard plate, and the keeper, and one wall of the casing.

12. The combination of a cylinder-body comprising a cylinder and a way in communication with the interior of the cylinder; a valve-casing in communication with the way of the cylinder; a valve movable in the valve-casing and having a reservoir adapted to accommodate a flowing volume of oil effective for lubrication and also effective for cooling the valve, and having a port admitting oil to the valve, perforations through which oil is applied on the contact surface of the valve and an opening for the discharge of the excess of oil into the valve-casing; and means for discharging the excess of oil from the valve-casing.

In witness whereof, I have hereunto signed my name at Springfield, Illinois, this 7th day of August, 1912.

JAMES L. COOK.

Witnesses:
 PEARL THAIN,
 W. S. TROXELL.

---

Copies of this patent may be obtained for five cents each, by addressing the "Commissioner of Patents, Washington, D. C."